US008812021B2

(12) United States Patent
Williams et al.

(10) Patent No.: US 8,812,021 B2
(45) Date of Patent: Aug. 19, 2014

(54) SYSTEM AND METHOD FOR COORDINATING MEETINGS BETWEEN USERS OF A MOBILE COMMUNICATION NETWORK

(75) Inventors: David Lothele Williams, Menlo Park, CA (US); Rohan Koduvayur Krishnan Chandran, Sunnyvale, CA (US); Kelvin Voon-Kit Chong, Mountain View, CA (US); Srinivas A. Mandyam, San Jose, CA (US); Krishna Vedati, Los Altos, CA (US)

(73) Assignee: Yellowpages.com, LLC, Glendale, CA (US)

( * ) Notice: Subject to any disclaimer, the term of this patent is extended or adjusted under 35 U.S.C. 154(b) by 116 days.

(21) Appl. No.: 13/310,657

(22) Filed: Dec. 2, 2011

(65) Prior Publication Data
US 2013/0143587 A1    Jun. 6, 2013

(51) Int. Cl.
*H04W 24/00* (2009.01)
(52) U.S. Cl.
USPC .................................................. 455/456.1
(58) Field of Classification Search
USPC .................................................. 455/456.1
See application file for complete search history.

(56) References Cited

U.S. PATENT DOCUMENTS

| | | | |
|---|---|---|---|
| 2004/0192339 A1* | 9/2004 | Wilson et al. | 455/456.1 |
| 2004/0254721 A1* | 12/2004 | Saiki | 701/207 |
| 2005/0243165 A1* | 11/2005 | Endler et al. | 348/14.02 |
| 2007/0069901 A1* | 3/2007 | Tuck et al. | 340/573.1 |
| 2009/0158167 A1* | 6/2009 | Wang et al. | 715/745 |
| 2011/0113148 A1* | 5/2011 | Salmela et al. | 709/229 |

* cited by examiner

*Primary Examiner* — Lester Kincaid
*Assistant Examiner* — Andy Gu
(74) *Attorney, Agent, or Firm* — Kilpatrick Townsend & Stockton LLP

(57) ABSTRACT

Systems and methods are provided to coordinate meetings between users of mobile devices on a mobile communications network. Users of the mobile communication network send one another meeting invitations over the network. The system receives the current geospatial position of one or more such users, as well as category selections that relate to attributes of potential meeting locations meetings. The system selects meeting locations for users using the current geospatial positions of the users and the category selections such that meeting locations are located at a geospatial positions between the users. The system can additionally select meeting locations that factor in user preferences and historical activities.

20 Claims, 5 Drawing Sheets

SYSTEM AND METHOD FOR COORDINATING MEETINGS BETWEEN USERS OF A MOBILE COMMUNICATION NETWORK

FIELD OF THE TECHNOLOGY

At least some embodiments disclosed herein relate, in general, to systems for coordinating meetings between users, and more particularly, to coordinating meetings between users of a mobile communications networks based, at least in part, on users' real-time geospatial location.

BACKGROUND

Mobile communications networks have long been used by users of such networks to communicate with one another for a variety of purposes, including coordinating meetings between one or more users. Many mobile communications networks are additionally aware of end-users' geospatial location in real-time, as well as users' demographic information and online activities.

BRIEF DESCRIPTION OF THE DRAWINGS

The embodiments are illustrated by way of example and not limitation in the figures of the accompanying drawings in which like references indicate similar elements.

FIG. 6 shows a method for identifying offers on a database that relate to a user's geospatial location and intent.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Various embodiments of the systems and methods disclosed herein enable users of a mobile communication network to coordinate meetings with one another such that locations selected for meetings are relevant to, inter alia, the users' current geospatial locations, the users' interests and preferences and the purpose of the meeting.

Figure 1:
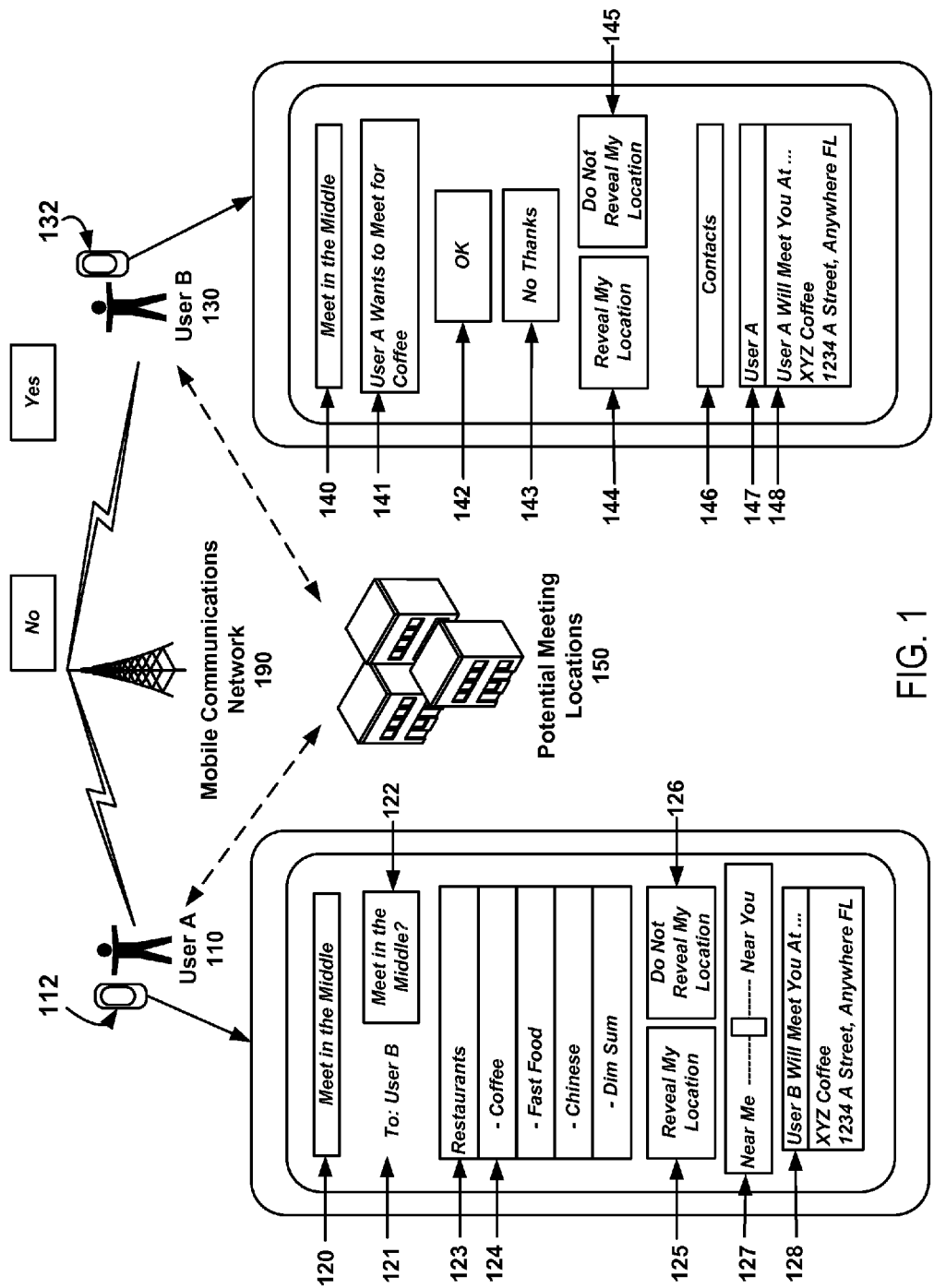
FIG. 1 shows a conceptual illustration of the operation of one embodiment of the systems and methods of the present disclosure.

FIG. 1 shows a conceptual illustration 100 of the operation of various embodiments of the systems and methods of the present disclosure.

Two users 110 and 130 are linked to a mobile communications network 190 via their respective mobile devices 112 and 132. The mobile communications network 190 can be any type of mobile communications network such as, without limitation, CDMA, GSM and satellite-based networks. The mobile devices 112 and 132 can be any type of portable device capable of communicating with the mobile network such as, without limitation, cell phones, smart phones, PDAs, tablet PC's laptop PCs and PDAs. In various embodiments, the mobile communications network 190 provides voice and messaging capabilities and may provide access to other networks such as, for example, other mobile communications networks and/or the Internet.

In various embodiments, the mobile communications network 190 tracks the geospatial location of the users' mobile devices 112 and 132 in real-time or near-time as the devices move with their respective users 110 and 120 from point to point. In various embodiments, the location of the mobile devices is determined using any technique now known, or later to be developed, in the art. For example, in an embodiment, the mobile devices 112 and 122 themselves automatically determine their own geospatial location via built in GPS capabilities and communicate their location to the mobile communications network 190 periodically or continuously. Additionally or alternatively, in an embodiment, the mobile communications network 190 determines the location of user mobile devices 112 and 132 using capabilities inherent in the network such as by triangulation or by determining the nearest transmission tower to the devices.

In the illustrated example, the users 110 and 120 are at geospatial positions within the coverage area of the mobile communications network 190. The mobile communications network 190 is aware of, and actively tracks, the geospatial position of the users' 110 and 130 mobile devices 112 and 132. The users 110 and 130 interact with their mobile devices 112 and 132 in a variety of ways including, without limitation, sending and receiving voice and text messages, sending and receiving emails, searching for subject matter using Internet based search and/or directory services and a variety of mobile apps hosted by their client devices. In so interacting with their mobile devices, the users 110 and 120 broadcast data relating to their interests and preferences over the mobile communications network 190.

In the illustrated example, user A 110 wants to meet user B 130 and share a cup of coffee. User A 110 opens a meeting coordination mobile application 120 on the user's mobile device 112, selects user B 121 and clicks on a "Meet in the Middle" button 122. A meeting coordination service sends a list of categories to user A's 110 mobile device 122. The categories are displayed to user A 110 using, for example, a scrolling, hierarchical list of categories 123 on the user A's 110 mobile device 112. In the illustrated example, user A 110 selects a category "Coffee" 124. In an embodiment, the categories comprise keywords and key phrases that describe businesses products, services, and attributes.

In an embodiment, User A's 110 mobile device 112 then displays a prompt that asks user A 110 whether he or she is willing to reveal 125 and 126 his or her current geospatial location to a meeting coordination service provider (not shown). In an embodiment, the user interface 120 additionally provides a slider 127 or other control that allows the initiating user 110 to determine whether any proposed meeting locations are closer to user A 110 or user B. In an embodiment, if user A 110 is unwilling 126 to reveal his or her current geospatial location, the mobile application 120 terminates.

In an embodiment, if user A 110 is willing 125 to reveal his or her current geospatial location, the mobile application 120 obtains the current geospatial location of user A's 110 mobile device 112, either from the device 112 itself, or from the mobile communication network 190, and transmits the location and the category selection 124 ("Coffee") to a meeting coordination service provider. In an embodiment, user A's 110 mobile device sends a message to user B's 130 mobile device 132, causing the mobile device to launch a meeting coordination mobile application 140 on the device 132. In an embodiment, the meeting coordination mobile application 140 informs user B 130 that user A 110 has invited user B 130 to meet for coffee 141. User B can accept 142 or decline 143 the invitation 141.

In an embodiment, if user B accepts 142 the invitation, User B's 130 mobile device 132 then displays a prompt that asks user B 130 whether or not he or she is willing to reveal 143 and 144 his or her current geospatial location to the meeting coordination service provider. In an embodiment, if user B 130 is unwilling 145 to reveal his or her current geospatial location, the mobile application 140 terminates. In an embodiment, if user B 130 is unwilling 146 to reveal his or her current geospatial location, the mobile application 120 does not terminate and the meeting coordination service chooses a meeting location based on user A's 110 location alone.

In an embodiment, if user B 130 is willing 125 to reveal his or her current geospatial location, the mobile application 140 obtains the current geospatial location of user B's 130 mobile device 132, either from the device 132 itself, or from the mobile communication network 190, and transmits the location to the meeting coordination service provider.

The meeting coordination service provider then selects a meeting location for the user's 110 and 130 using the category selection 124 and the user's 110 and 130 respective geospatial locations and, if applicable, any indication the meeting location should be closer to user A 110 or to user B 130 (e.g. the setting of the slider 127). In an embodiment, the meeting coordination service provider identifies businesses between user A 110 and user B 130 and selects a business that is at a geographic midpoint between the users. In an embodiment, the meeting coordination service additionally users user preferences, interests and historical activities for user A 110 and/or user B 130 to select a business near a geographic midpoint between the users 110 and 130 that additionally factors in user preferences, interests and historical activities of the users. For example, the meeting coordination service provider could select a location familiar to both users 110 and 130, or could select a location of user A's 110 favorite chain of coffee shops.

The meeting coordination service provider then sends the selected meeting location to the user's 110 and 130 respective mobile devices 112 132, that can display the locations to the users 110 and 130 in any conventional manner. For example, the mobile application 120 displays the selected location to user A 110 as a text message 128, and the mobile application 140 updates user B's 140 contact list to reflect the selected location 148 under a contact entry 147 for user A 110 in user B's 134 contact list or address book.

In an embodiment, if, after receiving a selected location 128, user A 110 moves the slider 127 in one direction or another, meeting the coordination service provider selects another location closer to user A 110 or user B, according to the position of the slider. In an embodiment, mobile application additionally provides user interface elements (not shown) that allows user A 110 and user B 130 to explicitly accept or reject the selected location, where if either user rejects the location, the meeting coordination service provider proposes another meeting location that is a next best fit (e.g. another coffee shop near the geospatial midpoint between the users 110 and 130).

In an embodiment, the mobile application 120 initiating the interaction between user A 110 and user B 130, controls the mobile application 140 on user B's device, and user B is cannot reject a selected meeting location or propose a new meeting location. In an embodiment, the mobile applications 120 and 140 function as peers, and either application can accept or reject locations and proposed a new meeting location (e.g. via a slider 127). In an embodiment, the user B's 130 mobile device does not have a meeting coordination application 140, and the meeting coordination service or user A's 110 mobile device simply sends the meeting location 148 to user B's 130 mobile device.

Figure 2:
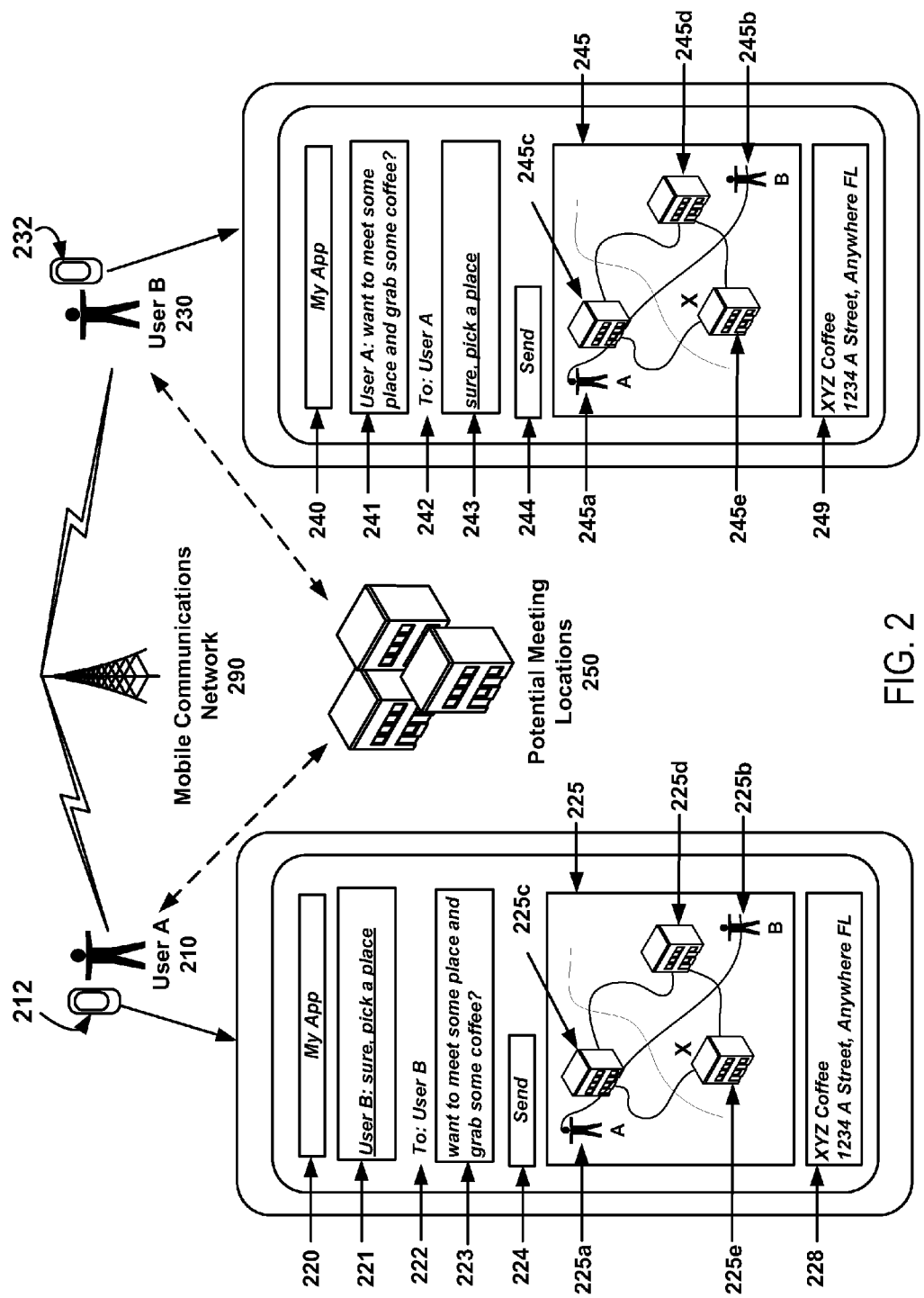
FIG. 2 shows a conceptual illustration of the operation of another embodiment of the systems and methods of the present disclosure.

The interface shown in FIG. 1 represents one illustrative interface for providing meeting coordination services via users mobile devices. The interfaces shown and their various controls are not intended, however, to be limiting. For example, FIG. 2 illustrates the integration of meeting coordination services into an instant messaging application.

In the illustrated embodiment, User A 210 opens an instant messaging application 220 on the user's mobile device 212, selects user B 222 and enters a text message "want to meet some place and grab some coffee?" in a message text entry box 223. User A 210 then clicks the send button 224 of the instant messaging application 220, sending the text message, over the mobile communications network to user B's 230 mobile device 232.

In the illustrated example, user B's 230 mobile device 232 receives the message from user A 210, opens an instant messaging application 240, and displays user A's 210 message in a text message display box 241 provided by the instant messaging application 240. User B 230 accepts user A's 210 invitation by entering a return message to user A 242 "sure, pick a place" in a message text entry box 243 and clicking the send button 244 of the instant messaging application 240, sending the text message, over the mobile communications network, to user A's 210 mobile device 212.

In an embodiment, a meeting coordination application on user A's 210 mobile device 212 recognizes that the dialog between user A 210 and user B 230 expresses an intent on the part of the users 210 and 230 to meet by, for example, recognizing the keyword "meet" in the dialog, as well as invitation (e.g. "want to") and acceptance (e.g. "sure"). In an embodiment, the meeting coordination application on user A's 210 device 212 additionally recognizes a potential selection of a category for the meeting, for example, by parsing the keyword "coffee" in the message 223. In an embodiment, the meeting coordination application on user A's 210 device 212 could be running continuously in the background on the device 212 or could be embedded in the instant messaging application 220. In an embodiment, a meeting coordination application on user B's 230 device 232 recognizes that the dialog between user A 210 and user B 230 expresses an intent on the part of the users 210 and 230 to meet by, for example, recognizing the keyword "meet" in the dialog, as well as invitation (e.g. "want to") and acceptance (e.g. "sure").

In an embodiment, the meeting coordination application on user A's 210 device 212 then sends the location of user A's 210 mobile device 212 and a potential category selection to a meeting coordination service provider (not shown) and the meeting coordination application on user B's 230 device 232 sends the location of user B's 210 mobile device 212 to a meeting coordination service provider.

The meeting coordination service provider then selects a meeting location for the user's 210 and 230 using the potential category selection and the user's 210 and 230 respective geospatial locations. In an embodiment, the meeting coordination service provider identifies businesses between user A 210 and user B 230 and selects a business that is at a geographic midpoint between the users and relates to the potential category selection. In an embodiment, the meeting coordination service additionally users user preferences, interests and historical activities for user A 210 and/or user B 230 to select a business near a geographic midpoint between the users 210 and 230 that additionally factors in user preferences, interests and historical activities. For example, the meeting coordination service provider could select a location familiar to both users 210 and 230, or could select a location of user A's 210 favorite chain of coffee shops.

The meeting coordination service provider then sends the selected meeting location to the user's 210 and 230 respective mobile devices 212 and 232, that can display the locations to the users 110 and 130 in any conventional manner. For example, in an embodiment, the mobile applications 220 and 240 on the user's 210 and 230 respective mobile devices 212 and 232 changes the text message "sure, pick a place" 221 and 243 into hyperlinks. In an embodiment, the hyperlinks 221 and 243, when selected by the user's 210 and 230 display a website supplied by the meeting coordination service.

In an embodiment, the website displays maps 225 and 245 and directory listings for the selected meeting location 228 and 249. The map 225 displayed on user A's 210 mobile device 212 displays the geospatial positions 225a and 225b of user A 210 and user B 230 respectively and the geospatial positions 225c, 225d and 225e of possible meeting locations 250. The map 245 on user B's 210 mobile device 212 displays identical information, including the geospatial positions 245a and 245b of user A 210 and user B 230 respectively and the geospatial positions 245c, 245d and 225e of possible meeting locations 250.

In an embodiment, the proposed meeting location 225e and 226 initially represents a meeting location 150 that is a best fit to the users 210 and 230 current geospatial positions, the meeting objectives and the users 210 and 230 preferences. For example, such a location could represent a location 150 whose geospatial position is exactly or nearly, midway between the current geospatial position of users A 210 and user B 230 and which represents a business liked by both user A 210 and user B 230.

In an embodiment, as the geospatial positions of A 210 and user B 230 change over time, the user's geospatial positions 225a-b and 245a-b displayed on the maps 225 and 245 are updated to reflect the users 210 and 230 current geospatial position. In an embodiment, the proposed meeting locations 225e, 226, 245e and 246 can change periodically based on the users 210 and 230 current geospatial position and/or other factors such as the current time. For example, if one of the users 210 and 230 is making slow progress towards the proposed meeting location, a new proposed meeting location may be displayed that is closer to the slow moving user. In another example, if the current time indicates that a proposed meeting location is closed, a new proposed meeting location may be displayed for a location 250 that is still open.

In an embodiment, one or both of the users 210 and 230 can propose a new meeting location in a variety of ways. In an embodiment, a user 210 or 230 proposes a new meeting location by sending a new meeting invitation to the other user. For example, user B 230 could send a message to user A 210 that includes the text "why don't we meet at burger bungalow?" In an embodiment, a user 210 or 230 proposes a new meeting location by selecting another potential meeting location 250. In an embodiment, a user 210 or 230 proposes a new meeting location by clicking on an alternate location displayed on the map 225 or 245 respectively.

Note that while the illustrated embodiments discussed above relate to the interaction of two users, the systems and methods shown could be adapted to support meeting coordination between multiple users.

Also note that the principles, systems and methods in the illustrate embodiments discussed above could be integrated into any online application supporting communications between users. For example, the embodiment illustrated in FIG. 2 could be integrated into a social networking or microblogging application such as, for example, the FACEBOOK and TWITTER social networking websites.

Figure 3:
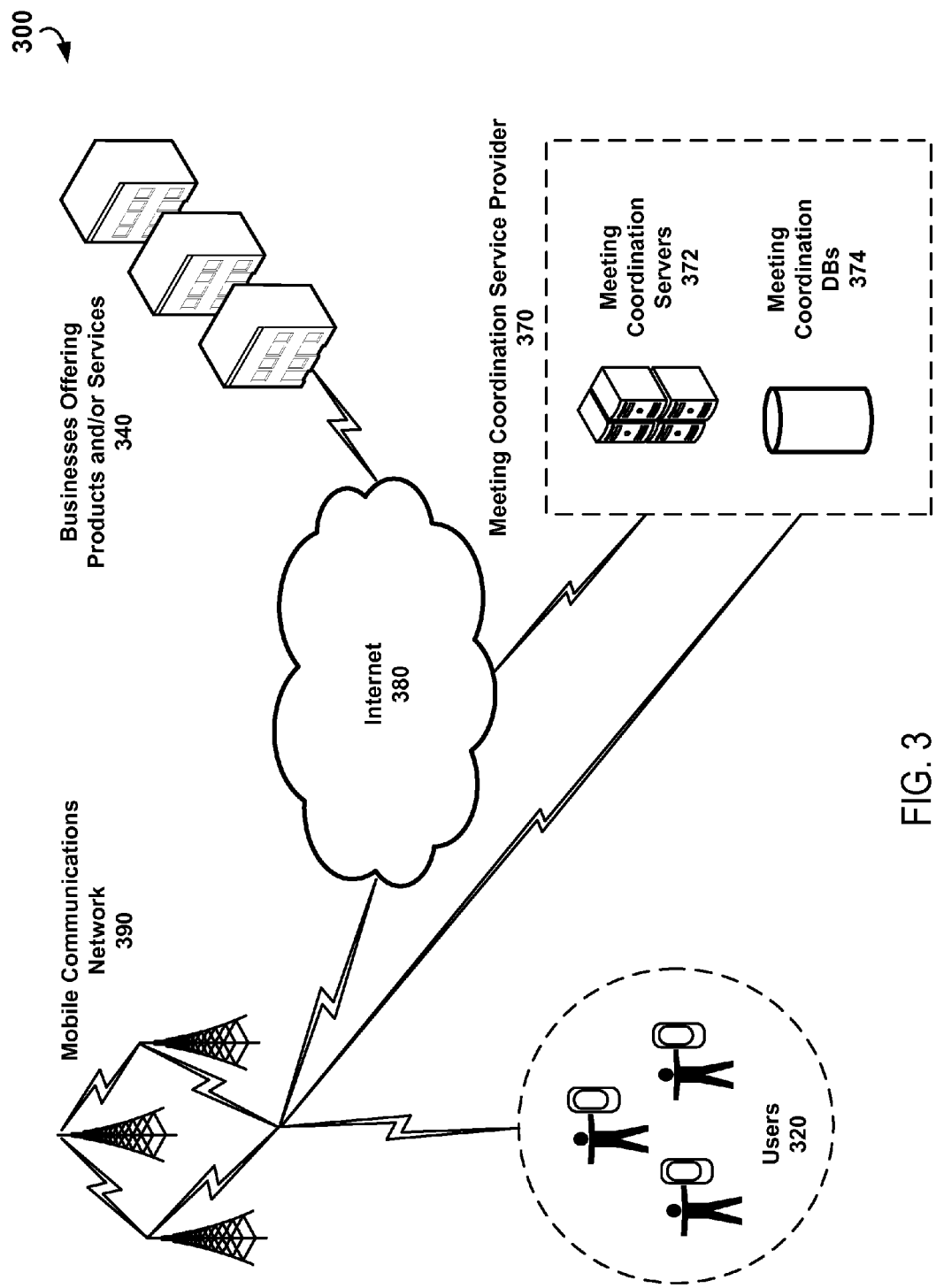
FIG. 3 illustrates an embodiment of a high level overview of a meeting coordination service provider and a network configuration through which the provider interacts with users of a mobile communication network.

FIG. 3 illustrates an embodiment of a high level overview 300 of meeting coordination service provider 370 and a network configuration through which the provider interacts with users 320 and service and product providers 340.

In the illustrated embodiment, a meeting coordination service provider 370 maintains one or more databases 374 including information relating to a number of businesses offering products and/or services. In an embodiment, the meeting coordination service provider 370 is a provider of a business directory service (e.g. online YELLOW PAGES). In an embodiment, the directory listings for individual businesses 340 provide various types of information about the businesses, for example, names, addresses, phone numbers, hours of operation, categories of products and services, and so forth. In an embodiment, the meeting coordination service provider 370 maintains one or more databases 374 including information relating to all business categories known to the service 370.

In an embodiment, a meeting coordination service provider 370 maintains one or more databases 374 including information relating to a number of users 320 of the service. In an embodiment, the meeting coordination servers 372 archive historical information on the meeting coordination databases 374 relating to users' geospatial locations over time. In an embodiment, the meeting coordination servers 372 archive historical information on the meeting coordination databases 374 relating to historical information relating to users' interactions with their mobile device over time. In an embodiment, the meeting coordination servers 372 maintain various other types of information on the meeting coordination databases 374 relating to users that may be relevant to businesses 340 such as, without limitation, user profile information, user demographics and user interests. In an embodiment, such information is obtained from any available source such as, for example, the mobile communications network 390, user profile or interest information on third party websites (not shown) or directly from the users 320 via the Internet 380.

In an embodiment, the mobile network 390 provides data relating to all users 320 of the mobile network to the meeting coordination service provider 370 on a periodic or continuous basis. In an embodiment, users 320 explicitly register with the meeting coordination service provider 370 and the mobile network 390 only provide data relating to registered users to the meeting coordination service provider 370. In an embodiment, users 320 register with the meeting coordination service provider 370 and maintain various types of profile and preference information stored on the meeting coordination databases 374 via facilities provided by the meeting coordination servers 372 such as, for example, a website.

In an embodiment, facilities hosted on the meeting coordination servers 372 receive requests from users 320 to coordinate meetings between such users 320 based on the geospatial locations of the users 320, categories of businesses of interest to the users 320 and information relating to various businesses 340. In an embodiment, facilities hosted on the meeting coordination servers 372 identifies businesses 340 located at geospatial positions between users 320 and selects meeting locations based on users' 320 category selections and respective geospatial locations. In an embodiment, facilities hosted on the meeting coordination servers 372 additionally use user 320 preferences, interests and historical activities for users 320 to select businesses near a geographic midpoint between the users 320 that additionally factor in user 320 preferences, interests and historical activities. In an embodiment, facilities hosted on the meeting coordination servers 372 send information related to selected meeting locations to users 320 via any suitable means, for example, text messages, emails, voice messages or a website.

Figure 4:
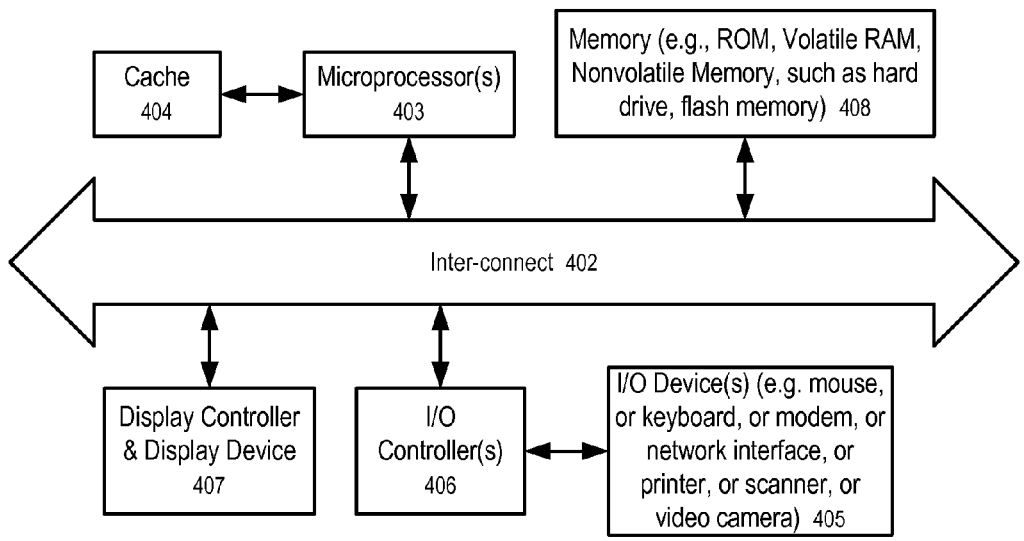
FIG. 4 shows a block diagram of a data processing system that can be used in various embodiments of the disclosed system and method.

FIG. 4 shows a block diagram of a data processing system which can be used in various embodiments of the disclosed system and method. While FIG. 4 illustrates various components of a computer system, it is not intended to represent any particular architecture or manner of interconnecting the components. Other systems that have fewer or more components may also be used.

In FIG. 4, the system 401 includes an inter-connect 402 (e.g., bus and system core logic), which interconnects a microprocessor(s) 403 and memory 408. The microprocessor 403 is coupled to cache memory 404 in the example of FIG. 4.

The inter-connect 402 interconnects the microprocessor(s) 403 and the memory 408 together and also interconnects them to a display controller and display device 407 and to peripheral devices such as input/output (I/O) devices 405 through an input/output controller(s) 406. Typical I/O devices include mice, keyboards, modems, network interfaces, printers, scanners, video cameras and other devices which are well known in the art.

The inter-connect 402 may include one or more buses connected to one another through various bridges, controllers and/or adapters. In one embodiment the I/O controller 406 includes a USB (Universal Serial Bus) adapter for controlling USB peripherals, and/or an IEEE-1394 bus adapter for controlling IEEE-1394 peripherals.

The memory 408 may include ROM (Read-Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In an embodiment, the meeting coordination servers 372 of FIG. 3 are implemented using one or more data processing systems as illustrated in FIG. 4. In an embodiment, user devices such as user mobile devices 112 and 122 of FIG. 1 and 212 and 222 of FIG. 2 are implemented using one or more data processing system as illustrated in FIG. 3.

In some embodiments, one or more servers of the system illustrated in FIG. 4 are replaced with the service of a peer to peer network or a cloud configuration of a plurality of data processing systems, or a network of distributed computing systems. The peer to peer network, or cloud based server system, can be collectively viewed as a server data processing system.

Embodiments of the disclosure can be implemented via the microprocessor(s) 403 and/or the memory 408. For example, the functionalities described above can be partially implemented via hardware logic in the microprocessor(s) 403 and partially using the instructions stored in the memory 408. Some embodiments are implemented using the microprocessor(s) 403 without additional instructions stored in the memory 408. Some embodiments are implemented using the instructions stored in the memory 408 for execution by one or more general purpose microprocessor(s) 403. Thus, the disclosure is not limited to a specific configuration of hardware and/or software.

Figure 5:
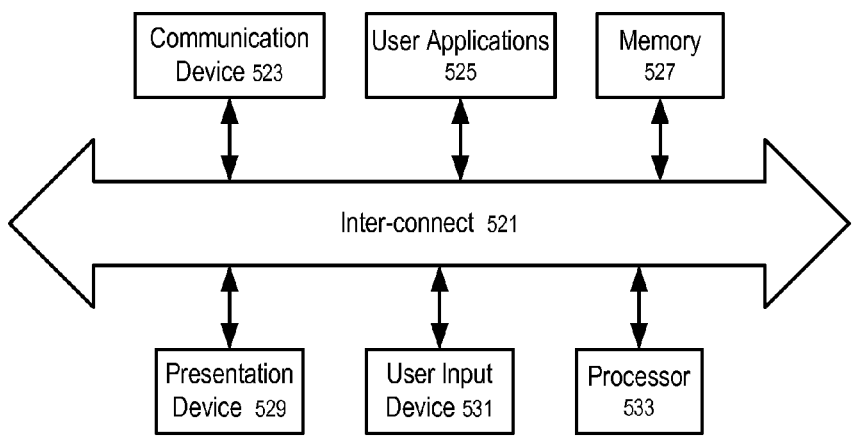
FIG. 5 shows a block diagram of a user device according to one embodiment.

FIG. 5 shows a block diagram of a user device, such as the devices 112 and 122 of FIG. 1 and 212 and 222 of FIG. 2 according to one embodiment. In FIG. 5, the user device includes an inter-connect 521 connecting a communication device 523, such as a network interface device, a presentation device 529, such as a display screen, a user input device 531, such as a keyboard or touch screen, user applications 525 implemented as hardware, software, firmware or a combination of any of such media, such various user applications (e.g. apps), a memory 527, such as RAM or magnetic storage, and a processor 533 that, inter alia, executes the user applications 525.

In one embodiment, the user applications implement one or more user interfaces displayed on the presentation device 529 that provides users the capabilities to, for example, access the Internet, send and receive messages and/or receive and display offers transmitted by a meeting coordination service provider such as the provider 270 or FIG. 2. In one embodiment, the user applications uses the communication device to communicate with meeting coordination servers such as that shown in 372 of FIG. 3.

In one embodiment, users use the user input device 531 to interacts with the device via the user applications 525 supported by the device, for example, by proposing and accepting invitations for meeting between users, as described in detail above with respect to FIGS. 1 and 2. The user input device 531 may include a text input device, a still image camera, a video camera, and/or a sound recorder, etc.

Figure 6:
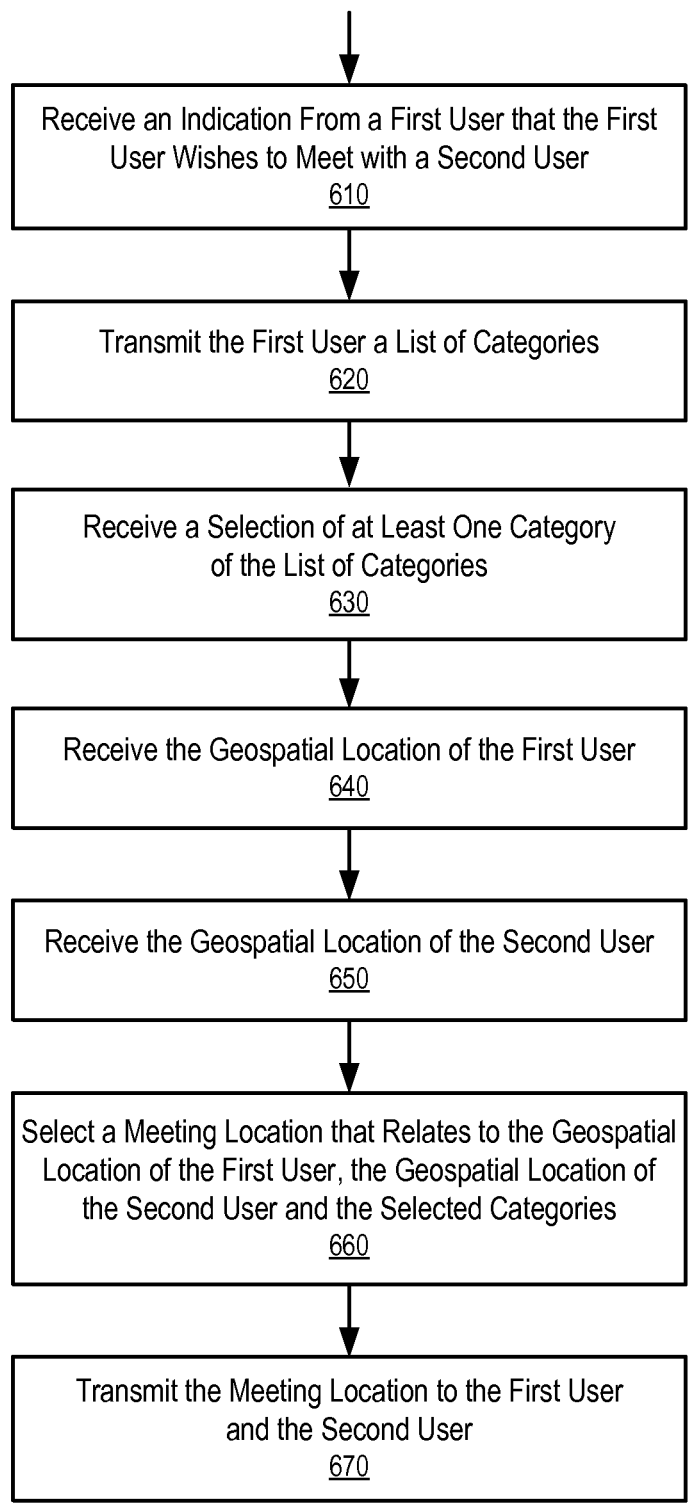
FIG. 6 shows a method for coordinating meetings between users based on user's geospatial locations and categories of interest.

FIG. 6 shows a method for coordinating meetings between users based on user's geospatial locations and categories of interest. In one embodiment, one or more servers such as the meeting coordination servers shown in 372 of FIG. 3 perform the operations of the method shown in FIG. 6, and meeting coordination databases such as that shown in 374 of FIG. 3 store the data collected and stored by the method.

In the first operation of the method, one or more processes running on a server receive 610, over a network, an indication from a mobile device of a first user that the first user wants to meet with a second user. In an embodiment, the mobile device of the first user sends such an indication to the processes running on the server when the user selects a user interface control on the user's mobile device, for example, the "Meet in the Middle" button 122 of FIG. 1. In an embodiment, the mobile device of the first user sends such an indication to the processes running on the server when a meeting coordination mobile application on the user's mobile device detects a dialog that indicates that two or more users wish to meet, for example, the dialog 221 and 223 shown FIG. 2.

In the second operation of the method, one or more processes running on a server transmit 620, over the network, a list of categories to the first mobile device. In an embodiment, the list of categories relate to a types of locations (e.g. businesses, service providers or other entities) where the first user wants to meet the second user. In an embodiment, the categories comprise keywords and key phrases that describe businesses products, services, and attributes. In an embodiment, the list of categories is hierarchical and progresses from more general to more specific descriptions of businesses, for example, restaurants→coffee→XYZ Coffee (e.g. a specific brand). In an embodiment, a meeting coordination mobile application on the user's mobile device displays the category list to the first user using, for example, the category list 123 of FIG. 1. Note that, in at least one embodiment, this operation is optional, as in the example illustrated in FIG. 2, where, a meeting coordination mobile application can parse a potential category of interest from dialog text, for example, the dialog 221 and 223 shown FIG. 2.

In the third operation of the method, one or more processes running on a server receive 630, over the network, a selection of a category of the list of categories. In an embodiment, the selected categories represent the type of entity (e.g. business) where the first user desires to meet the second user. In an embodiment, the mobile device of the first user sends such a selection to the processes running on the server when the user selects a category displayed on a user interface control on the user's mobile device, for example, the category list 123 of FIG. 1. In an embodiment, the mobile device of the first user sends such a category selection to the processes running on the server when a meeting coordination mobile application on the user's mobile device detects a dialog that indicates a potential category for the meeting, for example, the dialog 221 and 223 shown FIG. 2, as described in detail above.

In the fourth operation of the method, one or more processes running on a server receive 640, over the network, the geospatial location of the first user's mobile device from the first user's mobile device. In various embodiments, the first user's mobile device automatically determines its own geospatial location via built in GPS capabilities. Additionally or alternatively, in an embodiment, the network tracks the location of the first user's mobile device and supplies the location to the device periodically, continuously or on-demand. In various embodiments, the network determines the location of the first user's mobile devices using capabilities inherent in the network such as by triangulation or by determining the nearest transmission tower to the devices.

In an embodiment, the first user's mobile device only transmits the device's geospatial location to the processes running on the server if the first user explicitly grants the device permission to transmit the location data to the server. For example, in FIG. 1, the user's 110 and 130 mobile devices 112 and 132 only send the user's location data to a meeting coordination service if the user's select a user interface control 125 and 143 that grants the devices permission to reveal the user's location. In an embodiment, the processes running on the server cause the first user's mobile device to prompt the first user to grant the device permission to transmit the first user's location to the processes running on the server. In an embodiment, a mobile application on the first user's mobile device prompts the first user to grant the device permission to transmit the first user's location to the processes running on the server upon the first user's selection of categories of businesses of interest for the meeting.

In an embodiment, the geospatial location of the first user's mobile device is received in any format now known or later to be developed in the art such as, for example, latitude and longitude, GPS coordinates, and so forth.

In the fifth operation of the method, one or more processes running on a server receive 650, over the network, the geospatial location of the second user's mobile device from the second user's mobile device. In various embodiments, the second user's mobile device automatically determines its own geospatial location via built in GPS capabilities. Additionally or alternatively, in an embodiment, the network tracks the location of the second user's mobile device and supplies the location to the device periodically, continuously or on-demand. In various embodiments, the network determines the location of the second user's mobile devices using capabilities inherent in the network such as by triangulation or by determining the nearest transmission tower to the devices.

In an embodiment, the geospatial location of the first user's mobile device is received in any format now known or later to be developed in the art such as, for example, latitude and longitude, GPS coordinates, and so forth.

Note that, in various embodiments, only one geospatial location, that of the first user or that of the second user is required, and a meeting location is determined using a single user location.

In the sixth operation of the method, one or more processes running on a server select 650 a meeting location that relates to the geospatial location of the first user, the geospatial location of the second user and the selected categories. In an embodiment, the processes running on the server identifies businesses located at geospatial positions between the first user and the second user and selects a business that is at a geospatial point between the users and relates to the selected categories.

In an embodiment, the processes running on a server identifies businesses located at geospatial positions between the first user and the second user and selects a business that is at a geospatial point between the users and relates to the selected categories and further relates to the preferences and/or historical activities of the first user, the second user or both users. In an embodiment, the processes running on a server do not select a business where the current time represents a time that the business is not open.

In an embodiment, the processes running on the server select the geospatial point to be equidistant between the first user's geospatial location and the second user's geospatial location. In an embodiment, the processes running on the server select the geospatial point by identifying a centroid between the first user's geospatial location and the second user's geospatial location based on routes and travel times between the two users. In an embodiment, the processes running on the server select the geospatial point to be at a point closer to the first user's geospatial location or the second user's geospatial location in response to receiving an indication from the first user's mobile device that the meeting location should be closer to first user's geospatial location or the second user's geospatial location, respectively.

In an embodiment, if the processes running on the server only receive a geospatial location for the first user or the second user, the processes running on the server select a meeting location based on the geospatial location for the first user or the second user, respectively.

In an embodiment, meeting locations are selected from one or more databases accessible to the processes running on the server, for example, a database associated with an online directory service (e.g. online YELLOW PAGES) that, inter alia, categorizes businesses by location and type.

In the seventh operation of the method, one or more processes running on a server transmit 670, over the network, the meeting location to the first user's mobile device and the second user's mobile device using facilities provided by the mobile communications network including, without limitation, text messaging, voice messaging and/or multimedia messaging capacities provided by the network.

In an embodiment, the users' mobile devices receive and display meeting locations as a text directory listing, for example, the directory listing 128 of FIG. 1. In an embodiment, the users' mobile devices receive and display meeting locations as an update to a contact in an address book or contact list, for example, the contact 147 of FIG. 1. In an embodiment, the users' mobile devices receive and display meeting locations via a website provided by one or more processes running on a server, for example, the website 225 and 245 of FIG. 2.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
    receiving, over a network, from a first mobile device associated with a first user, an indication the first user wants to meet a second user;
    identifying, by a computing device, a category based at least in part on parsing information associated with the indication the first user wants to meet the second user to identify one or more keywords, wherein the category relates to a type of location and is identified based at least in part on the one or more keywords and without a selection of the first user;
    receiving, over a network, a selection of the category from the first mobile device, wherein the selection relates to the type of location where the first user wants to meet the second user;
    receiving, over a network, a first geospatial location from the first mobile device, wherein the first geospatial location is a current geospatial location of the first mobile device;
    receiving, over a network, a second geospatial location from a second mobile device associated with the second user, wherein the second geospatial location is a current geospatial location of the second mobile device;
    selecting, by the computing device, a meeting location, the meeting location comprising a geospatial location of one entity of a plurality of entities, wherein the meeting location relates to the first geospatial location and the second geospatial location and a type of the one entity of the plurality of entities relates to the category; and transmitting, over the network, a representation of the meeting location to the first mobile device and the second mobile device.

2. The method of claim 1, wherein the meeting location is selected such that geospatial location of the one entity of a plurality of entities is located at a geospatial position between the first geospatial location and the second geospatial position.

3. The method of claim 2, wherein the geospatial position is located at an equal distance from the first geospatial location and the second geospatial position.

4. The method of claim 2, wherein the geospatial position is located on a geospatial position on one route of a plurality of routes having a shortest travel time from the first geospatial location and the second geospatial location.

5. The method of claim 1, additionally comprising:
receiving, over the network, from the first mobile device, an indication the meeting location should be closer to the first geospatial position, wherein the meeting location is selected such that the geospatial location of the one entity of the plurality of entities is located at a geospatial position closer to the first geospatial location than the second geospatial location.

6. The method of claim 1, wherein the second geospatial location is not received and wherein the meeting location is selected such that the meeting location relates to the first geospatial location and the type of the one entity of the plurality of entities relates to the category.

7. The method of claim 1, wherein the meeting location is selected such that the meeting location additionally relates to a preference of the first user and the second user.

8. The method of claim 1, wherein the meeting location is selected such that the meeting location additionally relates to a historical activity of the first user and the second user on the network.

9. The method of claim 1, wherein the meeting location is selected such that the meeting location is associated with a time range reflecting times the one entity of the plurality of entities is open for business, such that a current time associated with the first mobile device is within the time range.

10. The method of claim 1, wherein the representation of the meeting location is selected from the list: text message, voice message, and multimedia message and email.

11. The method of claim 1, wherein the representation of the meeting location is an update to user data on the second mobile device.

12. The method of claim 1, wherein the representation of the meeting location transmitted to the second mobile device is an update to user data on the second mobile device.

13. The method of claim 12, wherein the user data on the second mobile device is contact information for the first user.

14. The method of claim 1, wherein the representation of the meeting location is a hyperlink to a website, the method additionally comprising:
in response to receiving, over the network, a selection of the hyperlink from the second mobile device, causing a webpage of the website to be displayed on the second mobile device, the webpage comprising a map displaying the meeting location.

15. The method of claim 1, additionally comprising:
in response to receiving the indication the first user wants to meet the second user, transmitting, over the network, a list of categories to the first mobile device,
and wherein the selection of the category from the first mobile device comprises a selection of a category from the list of categories.

16. The method of claim 15, wherein the list of categories comprises a hierarchical list of categories that describe products, services and attributes of the each entity of the plurality of entities.

17. The method of claim 1, additionally comprising:
receiving, over the network, an alternate meeting location from the second mobile device; and
transmitting, over the network, a representation of the second meeting location to the first mobile device and the second mobile device.

18. The method of claim 1, additionally comprising:
receiving, over a network, a third geospatial location from a third mobile device associated with a third user, wherein the third geospatial location is a current geospatial location of the third mobile device, and
wherein the meeting location is selected such that the meeting location relates to the first geospatial location, the second geospatial location and the third geospatial location and the type of the one entity of the plurality of entities relates to the category, and
wherein a representation of the meeting location the meeting location is transmitted, over the network, to the first mobile device and the second mobile device.

19. A non-transitory machine readable media storing instructions that, when executed by a data processing system, cause the data processing system to perform a method, the method comprising:
receiving, over a network, from a first mobile device associated with a first user an indication the first user wants to meet a second user;
identifying a category based at least in part on parsing information associated with the indication the first user wants to meet the second user to identify one or more keywords, wherein the category relates to a type of location and is identified based at least in part on the one or more keywords and without a selection of the first user;
receiving, over a network, a selection of the category from the first mobile device, wherein the selection relates to the type of location where the first user wants to meet the second user;
receiving, over a network, a first geospatial location from the first mobile device, wherein the first geospatial location is a current geospatial location of the first mobile device;
receiving, over a network, a second geospatial location from a second mobile device associated with the second user, wherein the first geospatial location is received from the first mobile device, wherein the second geospatial location is a current geospatial location of the second mobile device;
selecting a meeting location, the meeting location comprising a geospatial location of one entity of a plurality of entities, wherein the meeting location relates to the first geospatial location and the second geospatial location and a type of the one entity of the plurality of entities relates to the category; and
transmitting, over the network, a representation of the meeting location to the first mobile device and the second mobile device.

20. A computer system comprising:
a memory; and
a processor coupled to the memory to:
receive, over a network, from a first mobile device associated with a first user an indication the first user wants to meet a second user;
identify a category based at least in part on parsing information associated with the indication the first user wants to meet the second user to identify one or more keywords, wherein the category relates to a type of location and is identified based at least in part on the one or more keywords and without a selection of the first user;

receive, over a network, a selection of the category from the first mobile device, wherein the selection relates to the type of location where the first user wants to meet the second user;

receive, over a network, a first geospatial location from the first mobile device, wherein the first geospatial location is a current geospatial location of the first mobile device;

receive, over a network, a second geospatial location from a second mobile device associated with the second user, wherein the first geospatial location is received from the first mobile device, wherein the second geospatial location is a current geospatial location of the second mobile device;

select a meeting location, the meeting location comprising a geospatial location of one entity of a plurality of entities, wherein the meeting location relates to the first geospatial location and the second geospatial location and a type of the one entity of the plurality of entities relates to the category; and transmit, over the network, a representation of the meeting location to the first mobile device and the second mobile device.

\* \* \* \* \*